United States Patent
Duesterwald et al.

(10) Patent No.: US 10,977,562 B2
(45) Date of Patent: Apr. 13, 2021

(54) FILTER FOR HARMFUL TRAINING SAMPLES IN ACTIVE LEARNING SYSTEMS

(71) Applicant: International Business Machines Corporation, Armonk, NY (US)

(72) Inventors: Evelyn Duesterwald, Millwood, NY (US); Yiyun Chen, Jersey City, NJ (US); Michael Desmond, White Plains, NY (US); Harold L. Ossher, South Salem, NY (US); David J. Piorkowski, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 15/670,133

(22) Filed: Aug. 7, 2017

(65) Prior Publication Data
US 2019/0042953 A1  Feb. 7, 2019

(51) Int. Cl.
*G06N 5/04* (2006.01)
*G06N 5/02* (2006.01)
*G06K 9/62* (2006.01)
*G06N 20/00* (2019.01)

(52) U.S. Cl.
CPC ............ *G06N 5/025* (2013.01); *G06K 9/626* (2013.01); *G06K 9/6253* (2013.01); *G06K 9/6254* (2013.01); *G06K 9/6256* (2013.01); *G06N 5/042* (2013.01); *G06N 20/00* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 7,796,828 | B2 | 9/2010 | Han et al. |
| 8,762,298 | B1 | 6/2014 | Ranjan et al. |
| 2010/0161537 | A1 | 6/2010 | Liu et al. |

OTHER PUBLICATIONS

Zhao, Active Learning With Unreliable Annotations, Doctoral Thesis, Electronic Theses and Dissertations, University of Central Florida, 2013, pp. 1-126 (Year: 2013).*
Akoglu, et al., Graph-based Anomaly Detection and Description: A Survey, arXiv, 2014, pp. 1-68 (Year: 2014).*

(Continued)

*Primary Examiner* — Wilbert L Starks
(74) *Attorney, Agent, or Firm* — William H. Hartwell

(57) ABSTRACT

A computing method receives a labeled sample from an annotator. The method may determine a plurality of reference model risk scores for the first labeled sample, where each reference model risk score corresponds to an amount of risk associated with adding the first labeled sample to a respective reference model of a plurality of reference models. The method may determine an overall risk score for the first labeled sample based on the plurality of reference model risk scores. The method may further determine a probe for confirmation of the first labeled sample and a trust score for the annotator by sending the probe to one or more annotators. In response to determining a trust score for the annotator the method may add the labeled sample to a ground truth or reject the labeled sample.

25 Claims, 14 Drawing Sheets

(56) References Cited

OTHER PUBLICATIONS

Abhinav, Kumar, "Trustworthiness in Crowdsourcing", Computer Science, Indraprastha Institute of Information Technology, Delhi (IIIT-D), India, A Thesis Report submitted in partial fulfilment for the degree of MTech Computer Science, Jul. 29, 2015, 62 pages.

Dahir et al., "Dynamic Trust and Risk Scoring Using Last-Known-Profile Learning", An IP.com Prior Art Database Technical Disclosure, IP.com No. IPCOM000247388D, IP.com Electronic Publication Date: Aug. 31, 2016, Copyright 2016 Cisco Systems, Inc., 13 pages.

Delignat-Lavaud et al., "Network-based Origin Confusion Attacks against HTTPS Virtual Hosting", WWW 2015, May 18-22, 2015, Florence, Italy, pp. 227-237, ACM 978-1-4503-3469-3/15/05, <http://dx.doi.org/10.1145/2736277.2741089>.

Guan et al., "Nearest neighbor editing aided by unlabeled data", Information Sciences 179 (2009), pp. 2273-2282, Received Apr. 15, 2008, Received in revised form Jan. 20, 2009, Accepted Feb. 13, 2009, © 2009 Elsevier Inc., doi:10.1016/j.ins.2009.02.011.

Kantchelian et al., "Better Malware Ground Truth: Techniques for Weighting Anti-Virus Vendor Labels", AISec'15, Oct. 16, 2015, Denver, CO, USA, 12 pages, Copyright is held by the owner/author(s), Publication rights licensed to ACM, ACM 978-1-4503-3826-4/15/10, <http://dx.doi.org/10.1145/2808769.2808780>.

Nelson, Blaine, "Behavior of Machine Learning Algorithms in Adversarial Environments", Electrical Engineering and Computer Sciences University of California at Berkeley, Technical Report No. UCB/EECS-2010-140, Nov. 23, 2010, 244 pages, <http://www.eecs.berkeley.edu/Pubs/TechRpts/2010/EECS-2010-140.html>.

Santos et al., "Adaptive Learning Model for Application-Based Trust and Risk Scoring Using Consistent Profile Creation", An IP.com Prior Art Database Technical Disclosure, IP.com No. IPCOM000248565D. IP.com Electronic Publication Date: Dec. 19, 2016, 7 pages, Copyright 2016 Cisco Systems, Inc.

Sharifi, Mehrbod, "Interpretation of User Comments for Detection of Malicious Websites", CMU-LTI-12-016, Language Technologies Institute School of Computer Science Carnegie Mellon University, 5000 Forbes Ave., Pittsburgh, PA 15213, Submitted in partial fulfillment of the requirements for the degree of Doctor of Philosophy in Language and Information Technologies, 124 pages, © 2012, Mehrbod Sharifi.

"Method and Apparatus for Context Based Machine Learning Model", An IP.com Prior Art Database Technical Disclosure, Authors et. al.: Disclosed Anonymously, IP.com No. IPCOM000247499D, IP.com Electronic Publication Date: Sep. 10, 2016, 4 pages.

Chaudhuri et al., "Active Learning Beyond Label Feedback", Event: Interactive Learning, Tuesday, Feb. 14, 2017, 1:30 pm—2:15 pm, 94 pages, <https://simons.berkeley.edu/talks/kamalika-chaudhuri-02-14-2017>.

Jaho et al., "Alethiometer: a Framework for Assessing Trustworthiness and Content Validity in Social Media", WWW'14 Companion, Apr. 7-11, 2014, Seoul, Korea, pp. 749-752, ACM978-1-4503-2745-9/14/04, <http://dx.doi.org/10.1145/2567948.2579324>.

\* cited by examiner

FILTER FOR HARMFUL TRAINING SAMPLES IN ACTIVE LEARNING SYSTEMS

BACKGROUND

The present invention relates generally to the field of active learning systems, and more particularly to resilient active learning systems in the presence of untrusted annotators.

Active learning refers to a special case of semi-supervised machine learning where one or more users (also referred to as an "annotators") are iteratively queried to label selected training samples. Labeled samples received from annotators are added to the ground truth, which is used to train machine learning models. The accuracy of the machine learning model increases as more labeled samples received from annotators are added to the ground truth. In general, the goal of an active learning system is to increase the performance of the machine learning models while minimizing the number of samples presented to the annotators. To achieve this goal, active learning systems use specific policies to select training samples such as selecting those samples where the uncertainty of the learner is highest.

SUMMARY

According to an aspect of the present invention, there is a method, computer program product and/or system that performs the following operations (not necessarily in the following order): (i) one or more processors receive a first label for a sample from a first annotator, wherein the sample and the first label form a first labeled sample; (ii) one or more processors determine a plurality of reference model risk scores for the first labeled sample, where each reference model risk score corresponds to an amount of risk associated with adding the first labeled sample to a respective reference model of a plurality of reference models; (iii) one or more processors determine an overall risk score for the first labeled sample based on the plurality of reference model risk scores; and (iv) in response to determining that the overall risk score is within a predetermined threshold, one or more processors add the first labeled sample to a set of ground truth samples.

According to another aspect of the present invention, there is a method, computer program product and/or system that performs the following operations (not necessarily in the following order): (i) one or more processors receive a first label for a sample from a first annotator, wherein the sample and the first label form a first labeled sample; (ii) one or more processors determine a plurality of reference model risk scores for the first labeled sample, wherein each reference model risk score corresponds to an amount of risk associated with adding the first labeled sample to a respective reference model of a plurality of reference models; (iii) one or more processors determine an overall risk score for the first labeled sample based on the plurality of reference model risk scores; (iv) one or more processors determine a probe for confirmation of the first labeled sample, wherein the probe comprises a labeled sample determined to have a high confidence; (v) one or more processors determine a trust score for the first annotator by sending the probe to one or more annotators; and (vi) in response to determining a trust score for the first annotator by sending the probe to one or more annotators, one or more processors add the first labeled sample to a set of ground truth samples.

According to yet another aspect of the present invention, there is a method, computer program product and/or system that performs the following operations (not necessarily in the following order): (i) one or more processors determine a probe for confirmation of a first labeled sample, wherein the probe comprises a labeled sample determined to have a high confidence; and (ii) one or more processors determine a trust score for the first annotator by sending the probe to one or more annotators.

DETAILED DESCRIPTION

Figure 1:
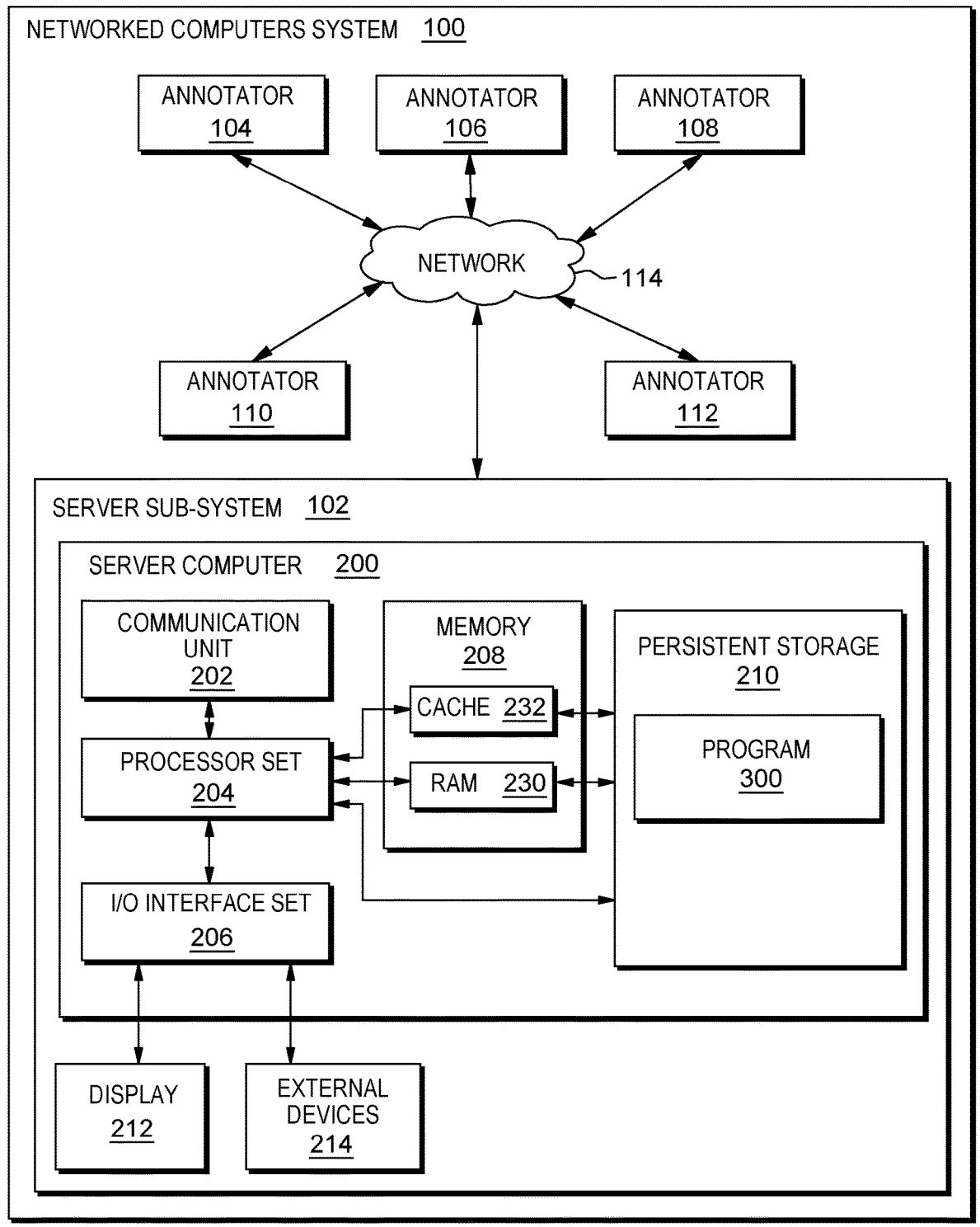
FIG. 1 is a block diagram view of an embodiment of a system according to the present invention.

Cognitive services increasingly rely on continuous learning and "learning on the job" where new training data is harvested from production use of the service or solution. For example, end user feedback may be explicitly solicited to obtain new training data in active learning. Online active learning approaches may assume that the annotator providing the feedback is a trusted annotator and may incorporate the feedback in the existing ground truth utilizing only routine sanitization processes. For this reason, these approaches expose a vulnerability for adversaries to manipulate and control ground truth in the system. These types of attacks are known as poisoning attacks. One kind of poisoning attack is a boiling frog attack, in which a series of small changes is made, each harmless-looking in itself, but adding up to a serious, disadvantageous manipulation of the ground truth. In general terms, the present disclosure is directed to methods and systems that: (i) mitigate poisoning attacks by filtering new training samples to ensure safe online learning in the presence of untrusted annotators; (ii) protect active learning systems from untrusted annotators, including adversarial and non-adversarial (e.g., biased) annotators; and (iii) enable safe scaling of active leaning in crowdsourcing environments.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; annotator sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2A:
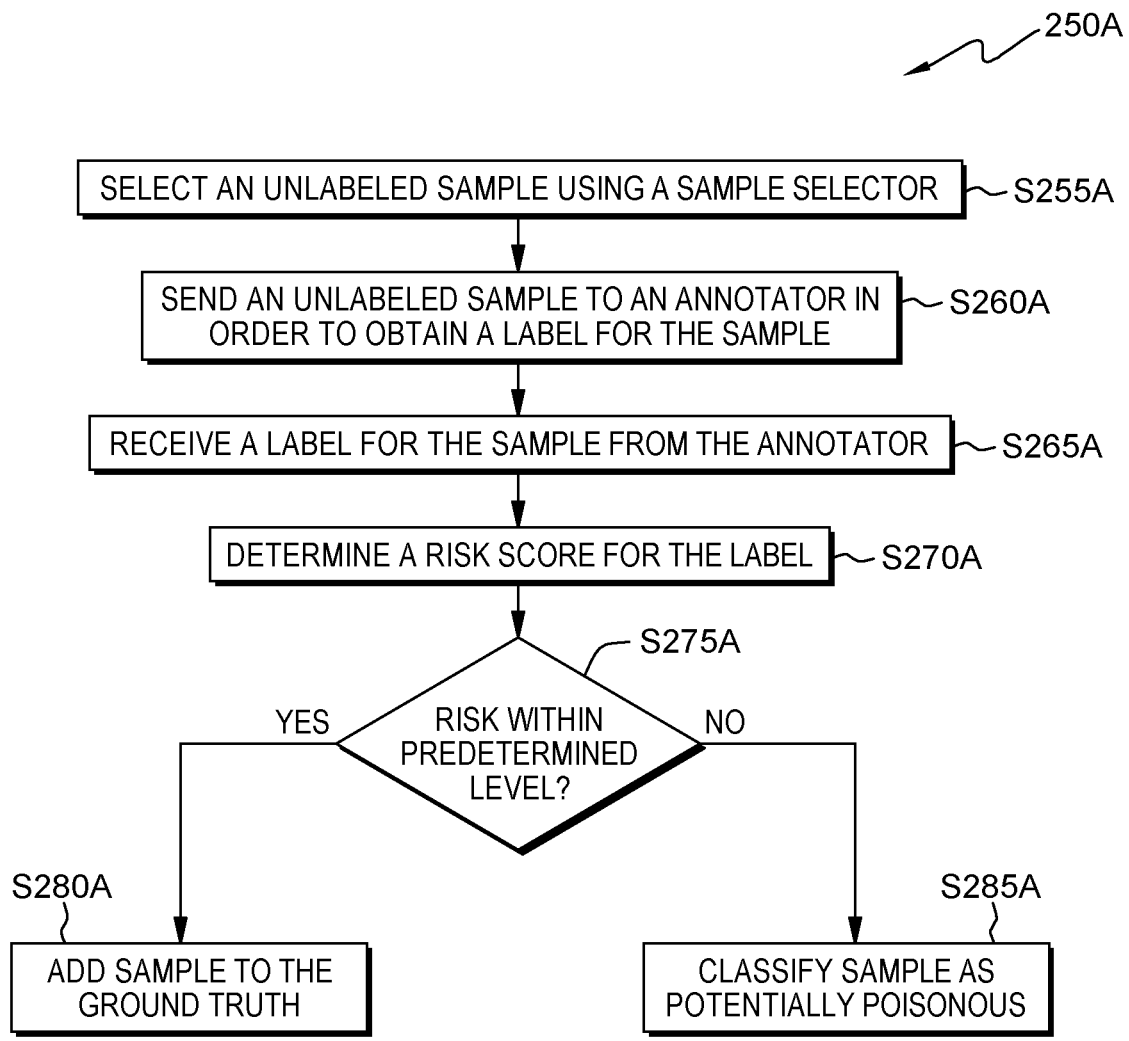
FIG. 2A is a flowchart showing an embodiment of a method to determine the risk for a label provided by an annotator.
Figure 2B:
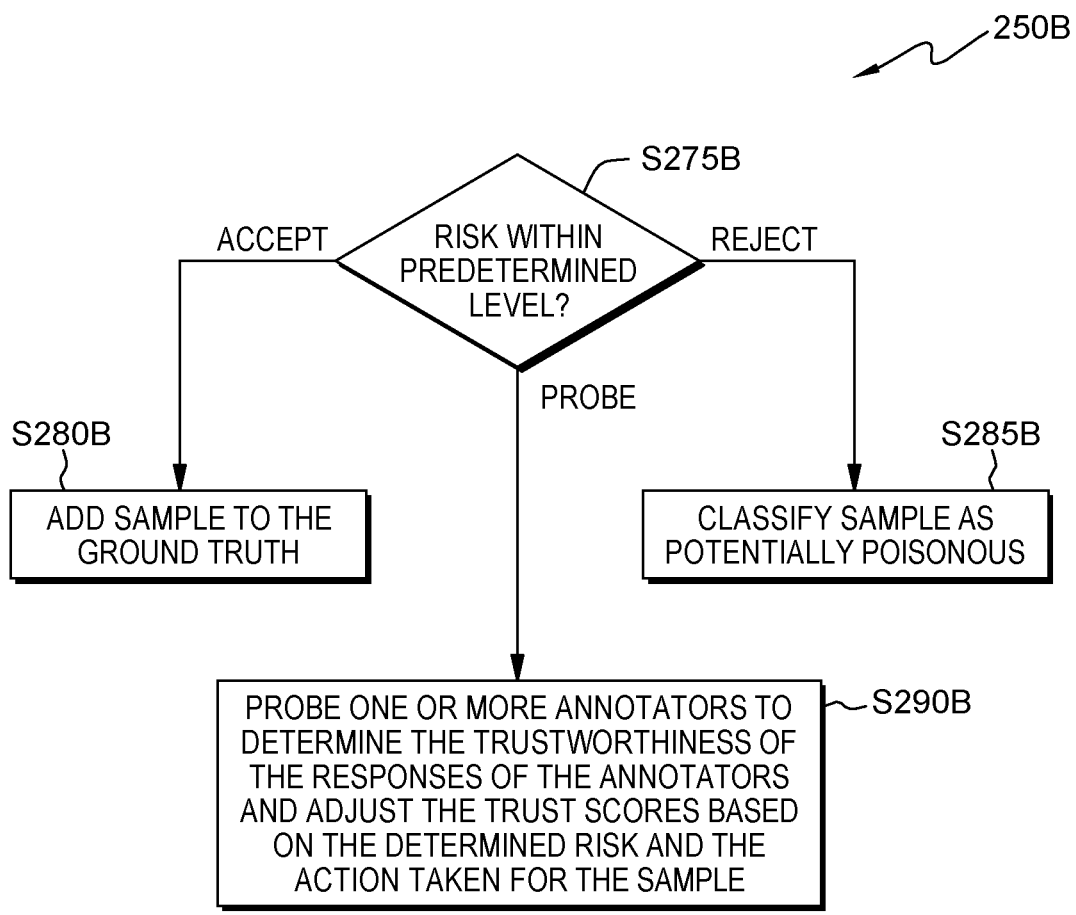
FIG. 2B is a flowchart showing an embodiment of a method to determine the action to perform for a label provided by an annotator.
Figure 2C:
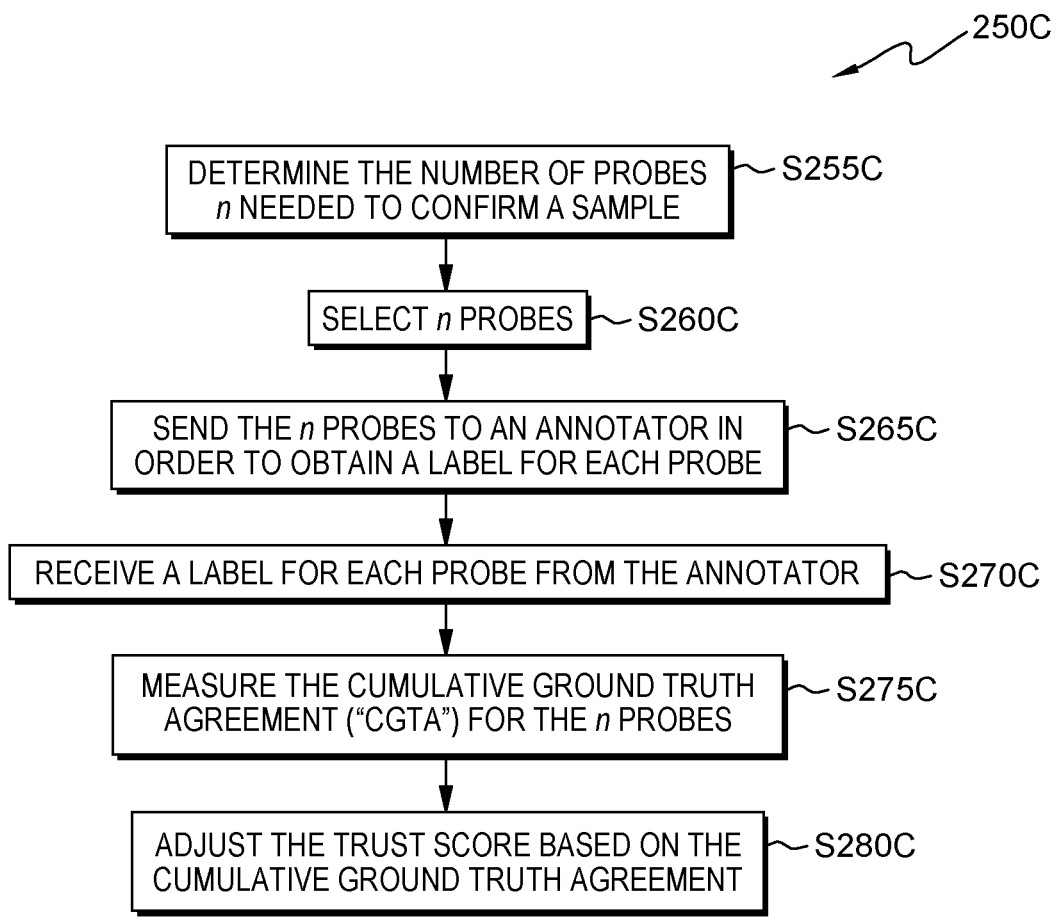
FIG. 2C is a flowchart showing an embodiment of a method to perform vertical probing.
Figure 2D:
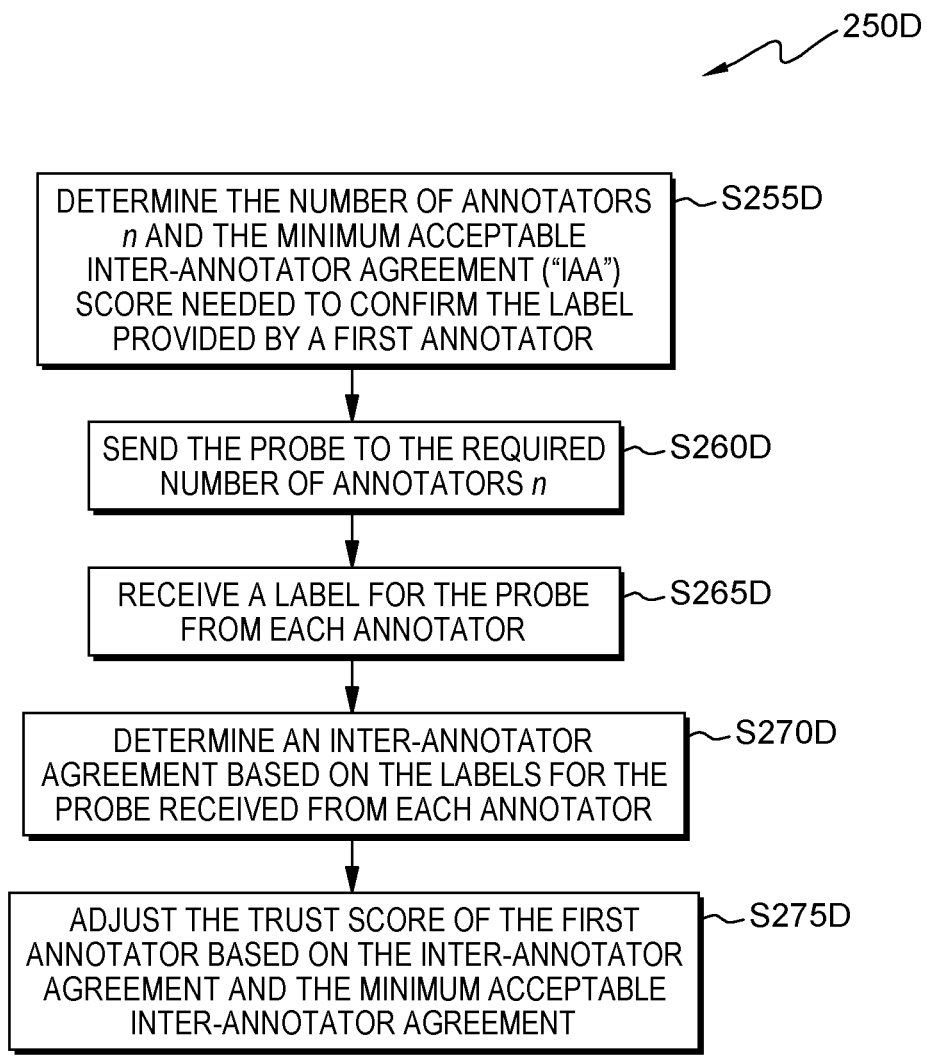
FIG. 2D is a flowchart showing an embodiment of a method to perform horizontal probing.
Figure 3:
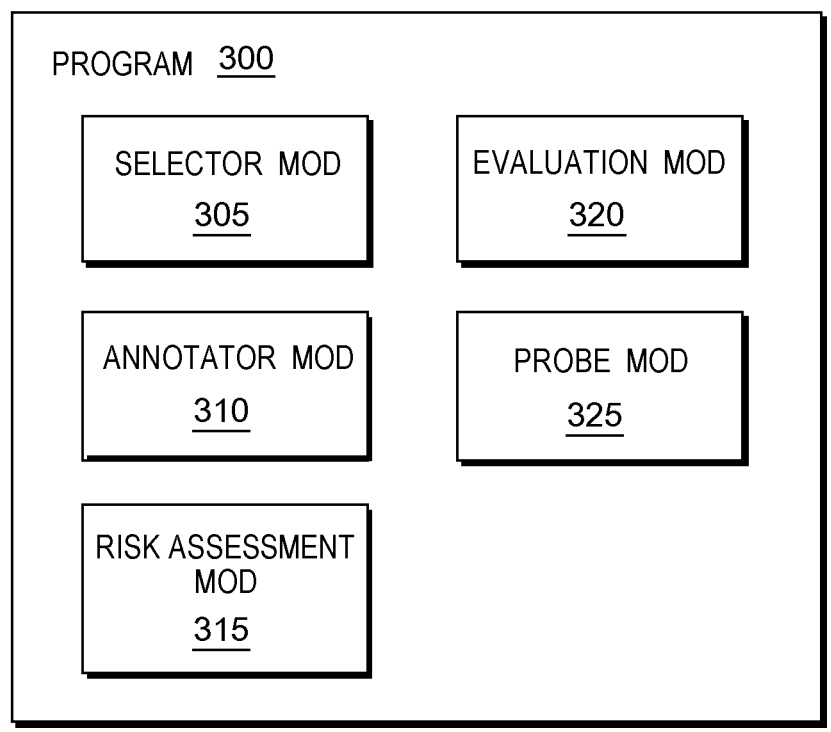
FIG. 3 is a block diagram showing a machine logic (for example, software) portion of an embodiment of the present invention.

FIG. 2A shows flowchart 250A depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks). These aspects of the invention are discussed in more detail, below, in the Further Comments and/or Embodiments subsection of this Detailed Description.

Figure 4A:
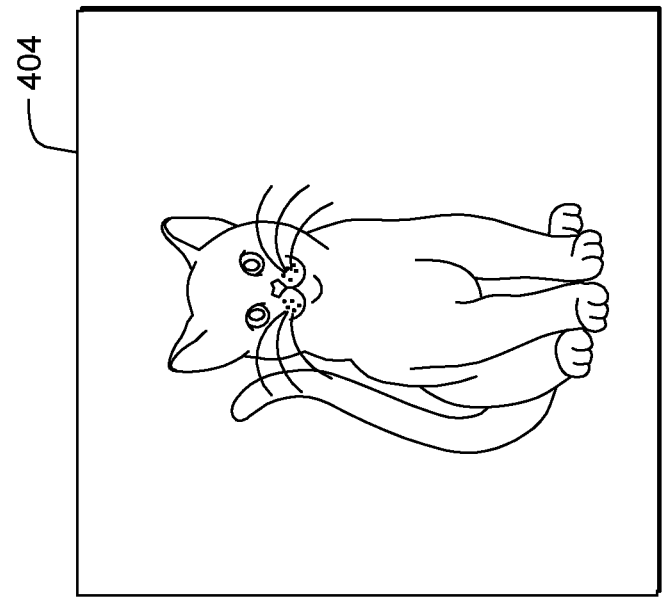
FIG. 4A depicts samples for which a label is required, according to an embodiment of the present invention.
Figure 4A:
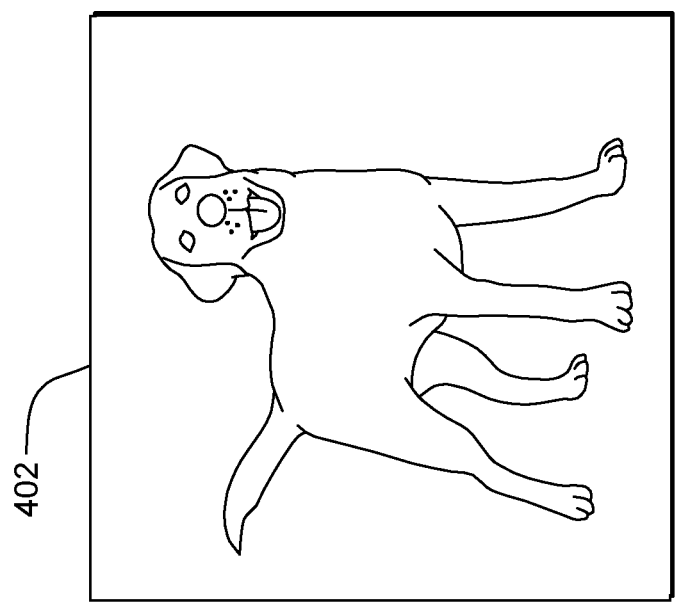
Figure 4B:
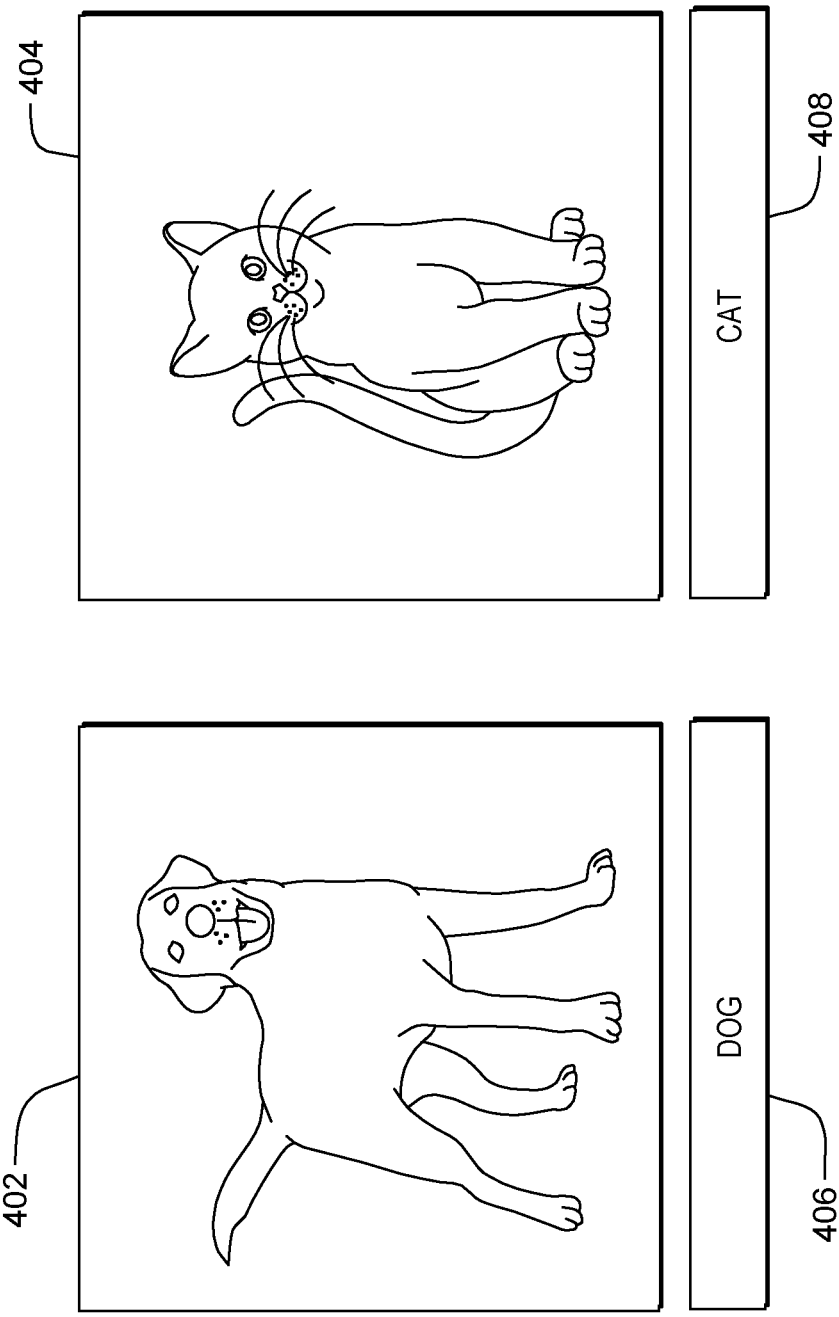
FIG. 4B depicts labels provided by annotators, according to an embodiment of the present invention.

Referring to flowchart 250A (see FIG. 2A), processing begins at operation S255A, where selector module ("mod") 305 (see FIG. 3) selects an unlabeled sample from a pool of unlabeled samples using a sample selector. For example, the sample selector may select those samples that yield the highest uncertainty when obtaining a classification using a current machine learning model (e.g., labeling those samples for which the current machine learning model is least certain). In some embodiments of the present invention, any suitable sample selection algorithm may be used. In an exemplary embodiment (shown in FIG. 4), an active learning system is trained to recognize pictures and drawings of cats and dogs. In this example, the selector module 308 selects samples 402 and 404 to obtain a label from one or more annotators (also referred to as a "user").

Processing proceeds to operation S260A, where annotator mod 310 sends the unlabeled sample to a user in order to obtain a label for the sample. A sample may be any type of data for which a label is required (e.g., audio, images, video, text, documents, among others). In some embodiments of the present invention, annotator mod 310 sends the unlabeled sample through network 114 to one of annotator sub-systems 104, 106, 108, 110, 112. In these and some other embodiments, an annotator at the annotator subsystem is presented with the unlabeled sample and queried to provide a label for the sample. After the user submits the label, processing continues to operation S265A, where annotator mod 310 receives a label for the sample from the user. In our exemplary embodiment, sample 402 is sent to user Ben at annotator sub-system 104 and sample 404 is sent to user Mary at annotator-subsystem 106. Ben provides the label 406 for sample 402 classifying the sample as a "DOG." Mary provides the label 408 for sample 404 classifying the sample as a "CAT."

Figure 5A:
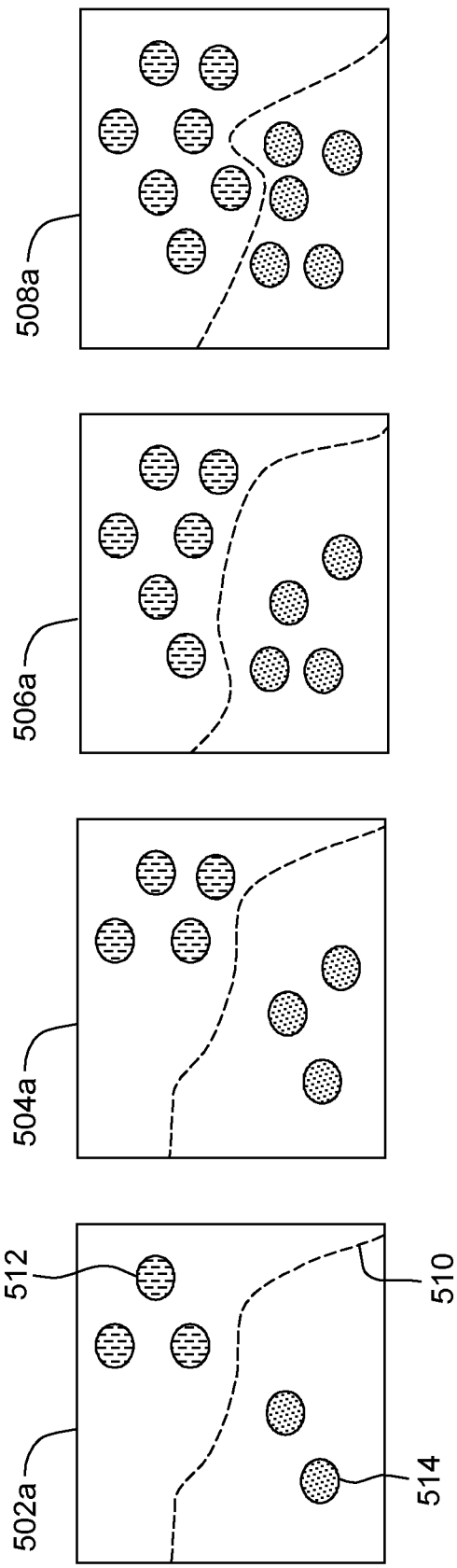
FIG. 5A depicts a plurality of reference models, according to an embodiment of the present invention.

Processing continues to operation S270A, where risk assessment mod 315 (see FIG. 3) determines a risk score for the label. In some embodiments of the present invention, the risk score is determined based on a series of versions of the machine learning model that have been trained over time and stored. In our exemplary embodiment (shown in FIG. 5A), a plurality of reference models 502a, 504a, 506a, and 508a have been trained at different times to recognize pictures and drawings of cats and dogs using labeled samples 512 and 514 from a ground truth. In this context, the ground truth is a collection of samples for which a label has been determined with high confidence (e.g., assigned by one or more annotators). In this example, labeled samples 512 represent samples labeled as cats and labeled samples 514 represent samples labeled as dogs. Decision boundary 510 represents the boundary in which each reference model determines whether the sample should be classified as a cat or a dog. Further, in this example newly-labeled samples are only added to the ground truth if the risk score is within a predetermined threshold of 0.50.

Figure 5B:
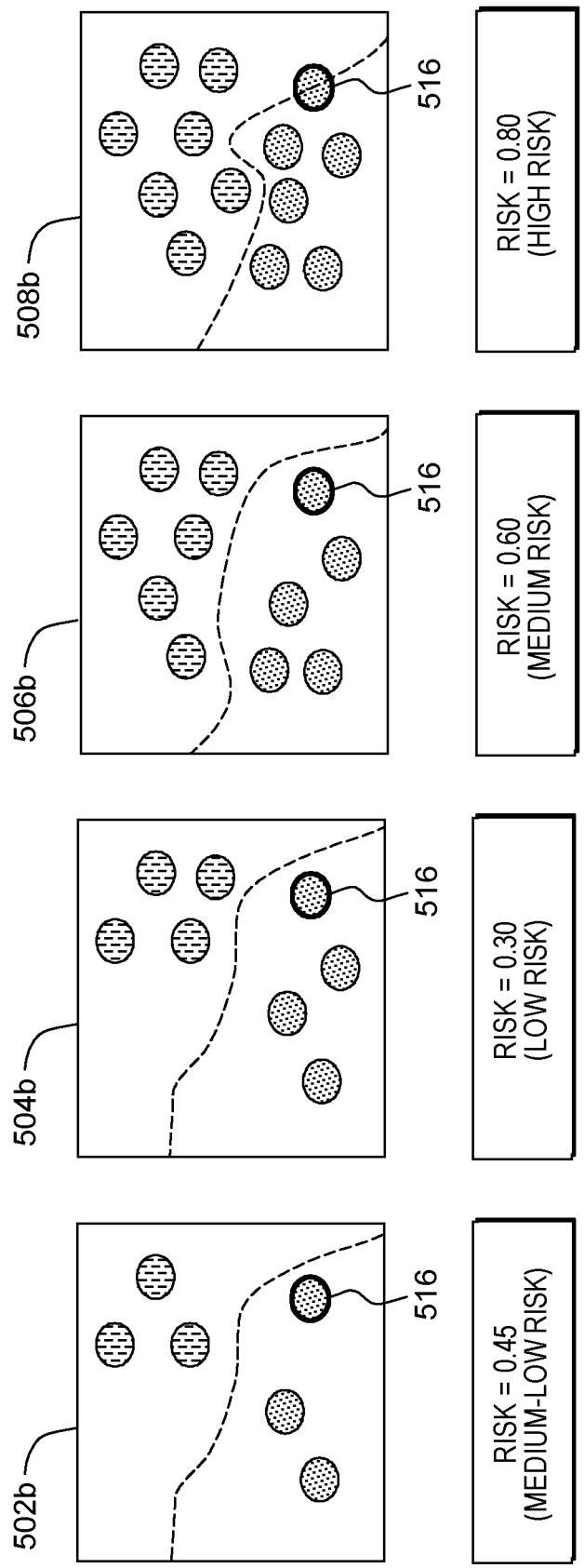
FIG. 5B depicts reference model risk scores corresponding to an amount of risk associated with adding a first labeled sample to respective reference models of a plurality of reference models, according to an embodiment of the present invention.

Continuing our exemplary embodiment (shown in FIG. 5B), labeled sample 516 corresponds to sample 402 coupled with label 406 as provided by Ben. Risk assessment mod 315 determines the risk of adding labeled sample 516 to the ground truth by determining the risk of adding the sample to each reference model in the plurality of reference models 502b, 504b, 506b, and 508b. In this example, the risk score vector for adding labeled sample 516 to the ground truth corresponds to the risk of adding labeled sample 516 to each of the reference models 502b, 504b, 506b, and 508b (e.g., R={0.45, 0.30, 0.60, 0.80}).

Figure 5C:
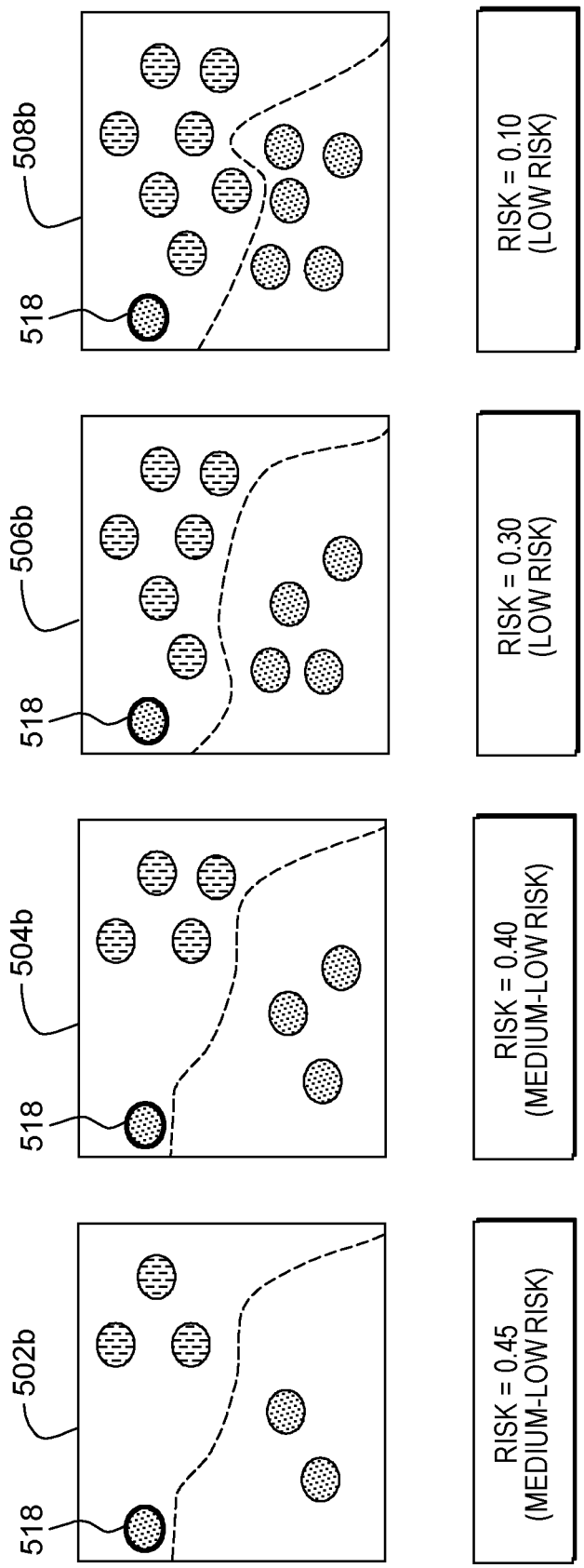
FIG. 5C depicts reference model risk scores corresponding to an amount of risk associated with adding a second labeled sample to respective reference models of a plurality of reference models, according to an embodiment of the present invention.

Continuing our exemplary embodiment (shown in FIG. 5C), labeled sample 518 corresponds to sample 404 coupled with label 408 as provided by Mary. Risk assessment mod 315 determines the risk of adding labeled sample 516 to the ground truth by determining the risk of adding the sample to each reference model in the plurality of reference models 502c, 504c, 506c, and 508c. In this example, the risk score vector for adding labeled sample 518 to the ground truth corresponds to the risk of adding labeled sample 518 to each of the reference models 502c, 504c, 506c, and 508c (e.g., R={0.45, 0.40, 0.30, 0.10}).

Processing proceeds to operation S275A, where evaluation mod 320 (see FIG. 3) accepts the user supplied sample based on whether the determined risk level is within a predetermined threshold. Some embodiments of the present invention employ an adaptive threshold for these purposes. In the case that the risk level for the sample is within the predetermined level, processing continues at operation 280A, where the sample is added to the ground truth (operation S275A, "yes" branch). Continuing our exemplary embodiment, taking the maximum risk of adding labeled sample 516 to the reference models 502b, 504b, 506b, and 508b (e.g., Average of {0.40, 0.30, 0.45, 0.80}=0.49), the risk is within the predetermined threshold. Similarly, taking the average risk for adding labeled sample 518 to the reference models 502c, 504c, 506c, and 508c (e.g., Maximum of {0.45, 0.40, 0.30, 0.10}=0.45), the risk is within the predetermined threshold and labeled sample 518 is added to the ground truth.

In the case that the risk level for the sample is not within the predetermined level, processing continues at operation 285A, where the sample is classified as potentially poisonous (operation S275A, "no" branch). Continuing our exemplary embodiment, taking the maximum risk of adding labeled sample 516 to the reference models 502b, 504b, 506b, and 508b (e.g., Maximum of {0.45, 0.30, 0.60, 0.80}=0.80), the risk is above the predetermined threshold, and so labeled example 516 is not added to the ground truth.

Referring to flowchart 250B (see FIG. 2B), in an alternate embodiment processing continues to operation S275B, where evaluation mod 320 selects an action based on the assessed risk for the user provided label. In the case that the risk level for the sample is within the predetermined level, processing continues at operation 280B, where evaluation mod 320 accepts the sample and adds to the ground truth (operation S275B, "accept" branch). In the case that the risk level for the sample is not within the predetermined level, processing may continue at operation S285B, where evaluation mod 320 rejects the sample and optionally generates an alert (operation 275B, "reject" branch). In some cases, however, such as when the risk level is near the predetermined level, evaluation mod 320 may also delay the decision by holding the sample until more has been learned about trustworthiness of the annotator through probing by continuing processing at operation 290B (operation 275B, "probe" branch). In some embodiments of the present invention, risk assessment mod 315 may include further actions, such as triggering a review of the sample by trusted annotators. In an alternative exemplary embodiment, evaluation mod 320 may choose to probe Mary because the risk for adding labeled sample 516 is similar to the predetermined threshold (e.g., risk equal to 0.45 is close to predetermined threshold of 0.50). These aspects of the invention are discussed in more detail, below, with respect to FIG. 2C and FIG. 2D.

Processing proceeds to operation S290B, where probe mod 325 probes one or more annotators to determine the trustworthiness of the responses of the annotators and adjusts the trust scores based on the determined risk and the action taken for the sample. In some embodiments of the present invention, probe mod 325 filters out potentially poisonous samples by generating targeted probes to determine a trust score for a given annotator. In these and some other embodiments, the goal is to determine whether a new sample can be safely added to the ground truth of a learner based on an assessment of the trustworthiness of an annotator and the assessed risk of the sample. Probe mod 325 aims to establish trustworthiness of annotators by probing individual annotators against the ground truth (i.e., vertical probing) and probing individual annotators against other annotators (i.e., horizontal probing). The result of the horizontal and vertical probing for each annotator, together with his/her history, is summarized in a trust score that represents the current trustworthiness of the annotator. New samples from an annotator may be accepted only if the risk of the samples is sufficiently balanced with respect to the trust score of the annotator.

In some embodiments of the present invention, probes take the form of a series of samples presented to the annotator for the purposes of evaluating the trustworthiness of the responses of the annotators. For example, probes can be taken from the ground truth to evaluate to what extent the annotator agrees or disagrees with the ground truth. In these embodiments, probing is used to learn trustworthiness of an annotator, where the information learned about an annotator is expressed in a trust score. In other words, the trust score of an annotator is updated and adjusted in response to probing said annotator. Probe mod 325 may also adjust the trust score based on the determined risk and the action taken for the sample (i.e., whether the sample was accepted, rejected, or delayed). In some embodiments of the present invention, the trust score may be adjusted using a trust score aging scheme where the trust score is automatically adjusted based on usage and elapsed time. In other embodiments, the trust score may be adjusted based on the results of the probes.

Figure 6A:
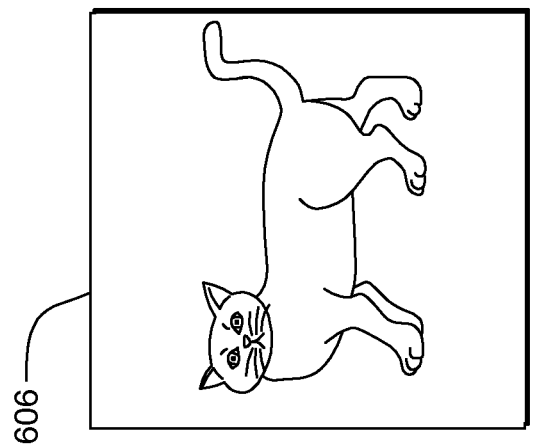
FIG. 6A depicts probes sent to a first annotator for confirmation of a labeled sample, according to an embodiment of the present invention.
Figure 6A:
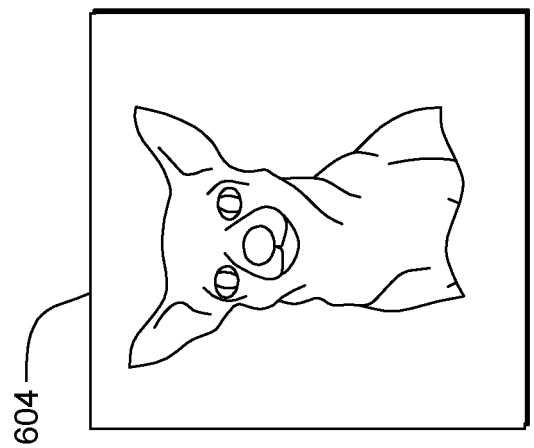
Figure 6A:
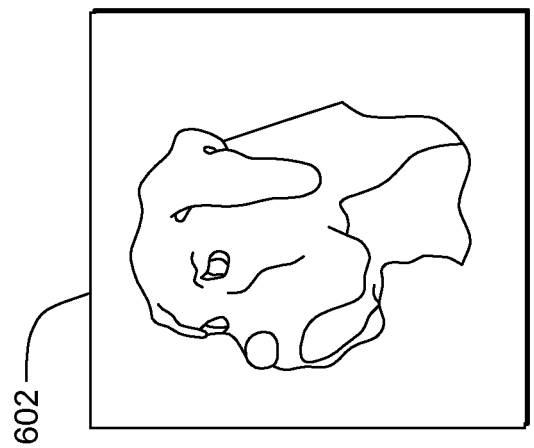

Referring to flowchart 250C (see FIG. 2C), some embodiments of the present invention perform vertical probing. Processing begins at operation S255C, where probe mod 325 determines the number of probes n needed to confirm a sample E annotated by a user. In some embodiments, this is based on the degree of suspicion and/or the trust score of the annotator. Continuing our alternative exemplary embodiment in FIG. 6A, labeled sample 518 provided by Mary is similar to the threshold level required to add labeled sample 518 to the ground truth. In this example, the trust score associated with Mary is fairly high (e.g., TS=0.75).

Therefore, probe mod 325 determines that three probes are necessary to confirm labeled sample 518.

Processing continues at operation S260C, where selector mod 305 selects n probes. For example, probes can be selected from the existing ground truth where correct labels are known or from unlabeled samples, where the correct label is predicted with high confidence. In some embodiments, the probe module selects probes based on similarity to sample E. In our exemplary embodiment, selector mod 305 selects probes 602, 604, and 606 to Ben in order to confirm labeled sample 516.

Figure 6B:
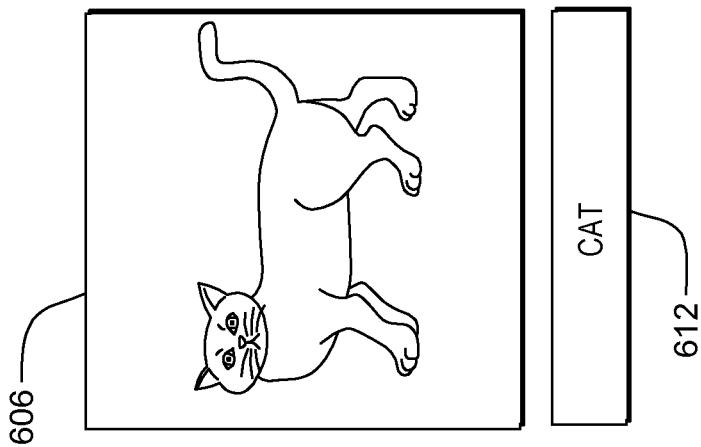
FIG. 6B depicts labels for the probes provided by the first annotator, according to an embodiment of the present invention.
Figure 6B:
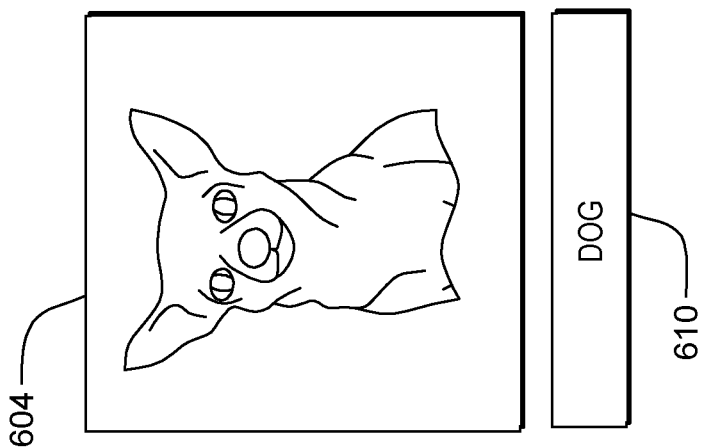
Figure 6B:
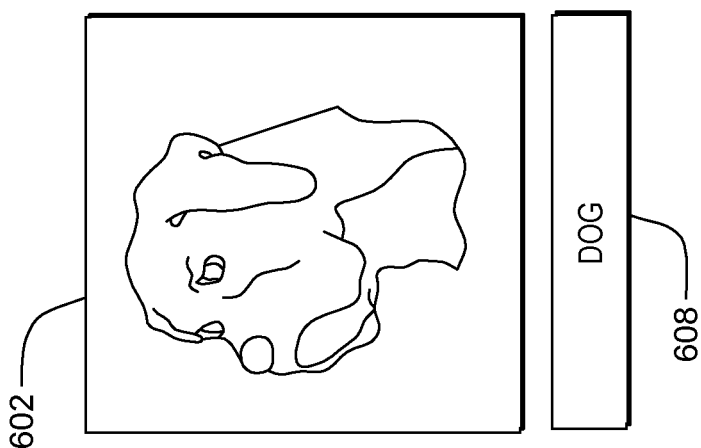

Processing proceeds to operation S265C, where annotator mod 310 sends the n probes to the annotator and receives labels from the user for each of the probes. In some embodiments of the present invention, annotator mod 310 sends the probes through network 114 to one of annotator sub-systems 104, 106, 108, 110, 112. In these and some other embodiments, an annotator at the annotator sub-system is presented with the probes and queried to provide a label for each probe. After the user submits the labels for the probes, processing continues to operation S270C, where annotator mod 310 receives a label for each probe from the user. In our exemplary embodiment (shown in FIG. 6B), annotator mod 305 sends probes 602, 604, and 606 to Ben in order to confirm labeled sample 516. Ben provides label 608 for probe 602 classifying the probe as a "DOG," label 610 for probe 604 classifying the probe as a "DOG," and label 612 for probe 606 classifying the label as a "CAT."

Processing continues to operation S275C, where evaluation mod 320 measures the cumulative ground truth agreement ("CGTA") for the n probes. In some embodiments of the present invention, evaluation mod 320 determines the cumulative ground truth agreement based on the ground truth agreement of each probe. In other embodiments, evaluation mod 320 determines the cumulative ground truth agreement based on the ground truth agreement of each probe and the trust score of the annotator that provided the label for the probe. In our exemplary embodiment, labels 608, 610, and 612 correspond with the stored ground truth label for probes 602, 604, and 606. Therefore, the CGTA for probes 602, 604, and 606 is 1.0.

Processing proceeds to operation S280C, where evaluation mod 320 adjusts the trust score based on the cumulative ground truth agreement. In some embodiments of the present invention, the trust score of all involved annotators is adjusted when there is disagreement over a specific probe. In some embodiments, the trust score of all the participating annotators is adjusted based on the level of disagreement and their relative trust scores when performing horizontal probing. In some embodiments, the trust score of all the annotators responsible for the ground truth sample is adjusted based on the level of disagreement when performing vertical probing. In some embodiments, the ground truth sample may be re-labeled if the trust score for the current annotator is high relative to the original annotators. This enables the learner to be self-repairing. In other embodiments, evaluation mod 320 may perform further probing (e.g., horizontal probing) to gather more opinions on the same sample. In our exemplary embodiment, the trust score associated to Ben is adjusted from 0.95 to 1.0. Additionally, labeled sample 516 may be added to the ground truth based on the results of the probing process.

Referring to flowchart 250D, some embodiments of the present invention may perform horizontal probing. Processing begins at operation S255D, where probe mod 325 determines the number of annotators n and the minimum acceptable Inter-Annotator Agreement ("IAA") score needed to confirm the label provided by a first annotator. In some embodiments of the present invention, an Inter-Annotator Agreement may be used as an additional mechanism to adjust the trust score of an annotator. In some embodiments, the minimum acceptable Inter-Annotator Agreement determines the minimum value necessary to accept confirmation for a sample. Continuing our alternative exemplary embodiment (shown in FIG. 6A), labeled sample 516 provided by Ben is similar to the threshold level required to add labeled sample 516 to the ground truth. In this example, the trust score associated with Ben is high (e.g., TS=0.95). Therefore, probe mod 325 determines that three probes are necessary to confirm labeled sample 516.

Figure 6C:
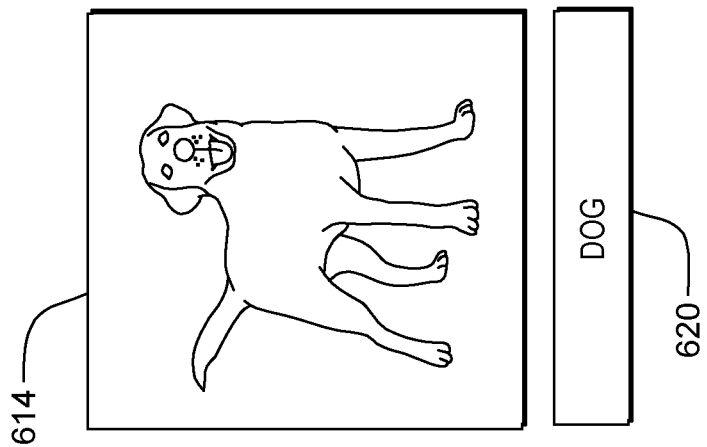
FIG. 6C depicts probes sent to a plurality of annotators for confirmation of a labeled sample, according to an embodiment of the present invention.
Figure 6C:
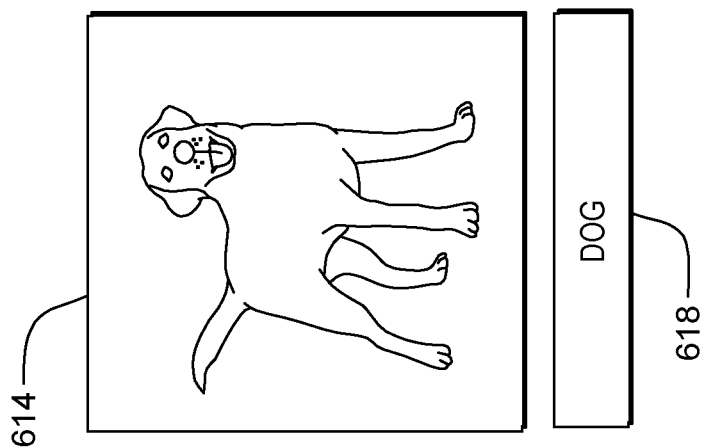
Figure 6C:
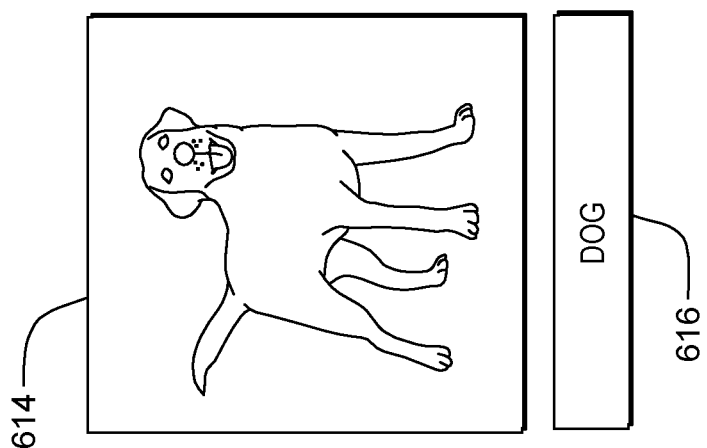

Processing proceeds to operation S260D, where annotator mod 310 sends the probe to the required number of annotators n and receives a label for the sample from each of the annotators. In some embodiments of the present invention, annotator mod 310 sends the probes through network 114 to the annotator sub-systems 104, 106, 108, 110, 112. In these and some other embodiments, an annotator at the annotator sub-system is presented with the probe and queried to provide a label for the sample. After the user submits the probe, processing continues to operation S265D, where annotator mod 310 receives a label for the sample from the user. In our exemplary embodiment (shown in FIG. 6C), annotator mod 305 sends probe 614 to users Mary, Thomas, and Jay in order to confirm labeled sample 516. Mary provides label 616 for probe 614 classifying the probe as a "DOG." Thomas provides label 618 for probe 614 classifying the probe as a "DOG" Likewise, Jay provides label 620 for probe 614 classifying the label as a "DOG."

Processing continues to operation S270D, where evaluation mod 320 determines an inter-annotator agreement ("IAA") based on the labels for the probe received from each annotator. For example, if the labels for the sample received from each annotator are different, the inter-annotator agreement will be a low score. In our exemplary embodiment, labels 616, 618, and 620 are all equal (e.g., "DOG") and correspond to labeled sample 516 as provided by Ben. Therefore, the IAA for probe 614 is 1.0.

Processing proceeds to operation S275D, where evaluation mod 320 adjusts the trust score of the first annotator based on the Inter-Annotator Agreement and the minimum acceptable Inter-Annotator Agreement. In some embodiments of the present invention, the trust score of all involved annotators is adjusted when there is disagreement over a specific probe. In some embodiments, the trust score of all the participating annotators is adjusted based on the level of disagreement and their relative trust scores when performing horizontal probing. In some embodiments, the trust score of all the annotators responsible for the ground truth sample is adjusted based on the level of disagreement when performing vertical probing. In some embodiments, the ground truth sample may be re-labeled if the trust score(s) for the current annotator(s) is high relative to the original annotators. This enables the learner to be self-repairing. In other embodiments, the learner may perform further probing (e.g., horizontal probing) to gather more opinions on the same sample. In our exemplary embodiment, the trust score associated to Ben is adjusted from 0.95 to 1.0. Additionally, labeled sample 516 may be added to the ground truth based on the results of the probing process.

III. Further Comments and/or Embodiments

Active Learning refers to a semi-supervised machine learning approach where a user (annotator) is iteratively queried to label selected training samples. Different active learning tools may have different ways to select and present unlabeled samples to annotators. A goal of active learning is to minimize the number of samples necessary while also optimizing the performance of the model trained from a resulting ground truth.

Prior approaches for protection against poisoning attacks include reject on negative influence (RONI) approaches that rely on a test or validation set. When new data is available, a new model is built and compared with the original model. If the validation set shows a decrease in accuracy, the new training data is rejected. This approach places a high reliance on a validation set and cannot detect attacks outside the test set scope. This approach is also computationally expensive as it requires retraining of the model at every test step.

Prior approaches for protection against poisoning attacks also include data sanitation techniques (e.g., nearest neighbor). Data sanitation techniques aim to eliminate noise and outlier samples from a training data set by comparing a new sample to other points in the data set that are closest to it (i.e., the k nearest neighbors). Another approach includes trusted actor analysis, where the prior behavior and reputation (e.g., on social networks) is used to determine actor trustworthiness when new training data is generated. Yet another approach includes tamper-free data delivery, where tamper-free reception of trusted data is achieved with a data provenance scheme.

Still another approach includes inter-annotator agreements used to determine reliability of labels (annotations) provided by multiple annotators. In this approach, the reliability of a single annotator's label is determined as a function of agreement with the label of other annotators. Inter-annotator agreements do not consider the effect of the new label on ground truth and cannot handle an orchestrated multi-actor attack because it uses a majority pool to detect untrusted actors.

In the context of active learning systems (also referred to as "learners"), a set of labeled samples is deemed to be poisonous (i.e., a set of poisoning samples) if adding the set of labeled samples to the ground truth results in a model that unlearns previously learned classifications. For example, in a system where a set of samples have been classified as class C with a high confidence level, introducing a poisoning sample may lead to some members of the set of samples to be classified as class C with a low confidence level, or classified in a different class.

In some embodiments of the present invention, a poison filtering system filters out poisoning samples when new training data is harvested in an online learning environment. In these and some other embodiments, the system determines the extent to which the new labels contradict or agree with the existing model. For example, if a set of new labels differ from high confidence predicted labels, the samples are deemed to be contradicting because of their potential to affect the labels in the current ground truth of the system.

In other embodiments of the present invention, the poison filtering system filters out potentially poisonous samples by generating targeted probes to determine a trust score for a given annotator. In these and some other embodiments, the goal is to determine whether a new sample can be safely added to the ground truth of a learner based on an assessment of the trustworthiness of an annotator and the assessed risk of the sample. The learner aims to establish trustworthiness of annotators by probing individual annotators against the ground truth (i.e., vertical probing) and probing individual annotators against other annotators (i.e., horizontal probing). The result of the horizontal and vertical probing for each annotator is summarized in a trust score that represents the current trustworthiness of the annotator. New samples from an annotator are only accepted if the risk of the samples is sufficiently balanced with respect to the trust score of the annotator.

Some embodiments of the present invention filter out potentially poisonous samples by evaluating whether the labeled sample has potential to poison the current ground truth. The learner examines the new sample in relation to existing ground truth and corresponding model. In some embodiments, the learner maintains a series of reference models in order to maintain sensitivity to gradual shifts over a series of poisonous samples (e.g., mitigation of Boiling Frog attacks). These and other embodiments perform risk assessment in relation to a predetermined number of prior reference models when assessing the risk of a new sample.

In some embodiments of the present invention, the risk for a new sample may be assessed given the result Risk_R of a multivariable weighted function F that receives a risk vector R as a parameter. For example, the risk may be determined based on a series of versions of the learner's machine learning model that have been trained over time and stored. The individual models in this series are referred to as reference models i, . . . , n. Given the vector R=[$R_1$, $R_2$, . . . , $R_n$], where each element $R_i$ represents the risk of adding the new sample to the ground truth based on an evaluation using reference model i, the Risk_R is equal to the result of function F(R). In these and some other embodiments, the overall risk is considered high if there exists one reference model in which the risk is high. In some embodiments, function F may be a function to find the maximum value of R (e.g., F(R)=max(R)). More sophisticated implementations may use functions suitable for analysis of gradual decay of risk to detect other types of attacks (e.g., boiling frog attacks).

In some embodiments, the risk value $R_i$ is a value in the range of [−1,1], where a value of −1 represents low risk and a value of 1 represents high risk. In these and some other embodiments, for each reference model $M_i$, sample S is classified to obtain a label and a confidence level. The system further determines the risk $R_i$ for each model $M_i$ based on the obtained label and the confidence level.

Sample S may be determined to be of high risk if the new sample contradicts the training data (e.g., high confidence level and different label). Sample S may be determined to be low risk if the new sample confirms the training data (e.g., high confidence level and same label). If the output label is identical to the input label, Sample S may further be determined to be medium risk if the new sample is near a decision boundary (e.g., low confidence level with same or different label). In these cases, the risk may be adjusted from medium-low to medium-high based on proximity to the decision boundary. Sample S may also be a determined to be medium-low risk if it is a new sample in a new area (e.g., low confidence level and a high distance with respect to class density). In some embodiments of the present invention, if the predicted label using reference model i is different from the supplied new label, the risk is identical to the confidence returned by the model, otherwise the risk is the negative of the confidence level.

Referring to an exemplary input, the system receives as input a new sample S with label Blue. In a first example, the reference model predicts label Red with a high confidence level of 0.9. Given the predicted label is different from the input label, and the high confidence level, the system determines that sample S is a high-risk sample of 0.9. In a second example, the reference model predicts label Blue with a high confidence level of 0.9. Given the predicted label is the same as the input label, and the high confidence level, the system determines that sample S is a low risk sample of −0.9. In a third example, the reference model predicts label Red with a confidence level of 0.2. Given the predicted label is different from the input label, and the confidence level of 0.2, the system determines that sample S is a medium risk sample of 0.2.

In some embodiments of the present invention, the risk assessment filter can be used to harvest new training labels from untrusted annotators (e.g., in crowdsourcing) where every annotator may be a potential adversary. In these and some other embodiments, it may be assumed that existing samples in ground truth are correctly labeled and must not be contradicted by new samples.

In some embodiments of the present invention, the learner may include user profiles as an indication of the trustworthiness of each annotator. In these embodiments, the risk for a new sample may be assessed given the result Risk_R of a multivariable weighted function F that receives a risk vector R as a first parameter and user profile U as a second parameter. For example, given a vector R=[$R_1$, $R_2$, . . . , $R_n$], where each element $R_i$ represents the risk of adding the new sample to the ground truth based on an evaluation using reference model i, and given the user profile U, where U is the profile of the user providing the new sample, the Risk_R is equal to the result of function F(R, U). The more trustworthy the user is believed to be, the lower the risk of including the user-provided sample in the ground truth.

In some embodiments of the present invention, the user profile U may be a value in the range of [0,1], where a value of one (1) represents total trustworthiness of the user and a value of zero (0) represents an untrustworthy user. In these and some other embodiments, the overall risk is considered high if there exists one reference model in which the risk is high. In some embodiments, function F may be a function to find the maximum value of R where the overall risk is reduced based on the user profile U (e.g., F(R,U)=(1−U)(max(R)+1)−1. In this risk function F, the overall risk is considered high as long as there exists one reference model in which the risk is high, but the risk is reduced based on the trustworthiness of the user.

In some embodiments of the present invention, the user profiles can be provided. For example, a trusted annotator deploying the system (e.g., an employee of a company) might be assigned U=1 while every other user is assigned U=0.2. In other embodiments, the learner may update the profile for the user based on the risk with which the sample is assessed. In yet other embodiments, the user profile may be updated based on the alerts triggered by the user. In still other embodiments, alerts triggered by a user may in turn trigger a review, possibly involving probing, where the user profile may be adjusted based on the result of the review.

In other embodiments of the present invention, a more complex model keeps track of and uses the trustworthiness of the users making changes affecting the last n reference models. In these embodiments, the risk for a new sample may be assessed given the result Risk_R of a multivariable weighted function F that receives a risk vector R as a first parameter, a user profile vector V as a second parameter, and current user profile U as a third parameter. For example, given a vector R=[$R_1$, $R_2$, . . . , $R_n$], where each element $R_i$ represents the risk of adding the new sample to the ground truth based on an evaluation using reference model i, given a vector V=[$U_1$, $U_2$, . . . , $U_n$], where each element $U_i$ represents the user profile of the user who made the changes leading to reference model i from reference model i−1, and given the user profile U, where U is the profile of the user providing the new sample, the Risk_R is equal to the result of function F(R, V, U). In these and some other embodiments, F can give greater weight to models created by trustworthy users.

Some embodiments of the present invention determine whether the sample can be safely added to the ground truth based on an assessment of the trustworthiness of the annotator and the assessed risk of the sample. In these embodiments, the learner aims to establish trustworthiness of annotators by probing individual annotators against the ground truth (i.e., vertical probing) and across annotators (i.e., horizontal probing). Information learning about the annotators is summarized in a trust score ("TS") for each annotator. Samples from an annotator are only accepted if the risk of the sample is sufficiently balanced by the trust score of the annotator. In these and some other embodiments, the learner generates targeted probes to determine an appropriate trust score for a given annotator. In general, the trustworthiness assessment of an annotator (i.e., the trust score associated to an annotator) may be used to guide learning in any online learning application where one user can influence the learning for other users.

In some embodiments of the present invention, probes take the form of a series of samples presented to the annotator for the purposes of evaluating the trustworthiness of the responses of the annotators. For example, probes can be taken from the ground truth to evaluate to what extent the annotator agrees or disagrees with the ground truth. In these embodiments, probing is used to learn the trustworthiness of an annotator, where the information learned about an annotator is expressed in a trust score. In other words, an annotator's trust score is updated and adjusted in response to probing said annotator.

Some embodiments of the present invention implement reactive probes. Reactive probing refers to probes triggered in response to suspicious labeling to determine if the annotator can be trusted. In some embodiments, reactive probing initiates a probe each time a decision to accept or reject a label is being delayed (e.g., because of lack of conclusive evidence) using the current sample as the trigger sample for the probe.

Some embodiments of the present invention implement proactive probes. Proactive probing refers to probes used to maintain trust scores or to assess trust scores early in the active learning process. In some embodiments, proactive probing initiates a probe each time after n new labels are obtained from a given annotator, using the nth sample as the trigger sample for the probe.

In some embodiments of the present invention, ground truth agreement ("GTA") may be used to determine the agreement of an annotator-supplied label with respect to the ground truth. In some embodiments, the ground truth agreement is used to determine whether the annotator-supplied label looks suspicious as compared to the samples stored in the ground truth. In some embodiments, the ground truth agreement is measured using a risk assessment filter. For example, the ground truth agreement may be inversely related to the poisoning risk of adding the label to the ground truth. In other embodiments, the ground truth agreement may be measured using validation testing. For example, the ground truth agreement may be measured using a test set to evaluate the agreement. In some embodiments, the learner may add the new label to the ground truth and retrain the model with the added label. In some embodiments, the learner may compare the performance of the new model (i.e., the model with the new label) against the existing model using a test set. In these and some other embodiments, the ground truth agreement is based on the result of this test. For example, identical results in both the existing and the new models are indicative of high ground truth agreement. Other methods for measuring the ground truth agreement are also possible.

In some embodiments of the present invention, vertical probing assumes the annotator might be an adversary and selects probes with the aim of exposing contradictions between the annotator and the ground truth. Vertical probing is useful, for example, when probes are required for a single annotator. In some embodiments, given a sample E, the learner determines the number of probes n needed to confirm the sample E based on the degree of suspicion (e.g., n=$F_2$(GTA(E), TS)). In these and some other embodiments, the learner selects n probes to present to the user. For example, probes can be selected from the existing ground truth where correct labels are known or from unlabeled samples, where the correct label is predicted with high confidence. In some embodiments, the learner selects probes based on similarity to sample E. In some embodiments, the learner presents the n probes to the annotator and receives labels for each of the probes. In some embodiments, the learner measures the cumulative ground truth agreement ("CGTA") for the n probes (e.g., CGTA=$F_3$($GTA_1$, $GTA_2$, ..., $GTA_n$)). In some embodiments, the learner adjusts the trust score based on the cumulative ground truth agreement (e.g., $TS_{new}$=$F_4$(TS, CGTA)).

In some embodiments of the present invention, the learner uses horizontal probing. In horizontal probing, an Inter-Annotator Agreement ("IAA") may be used as an additional mechanism to adjust the trust score. In some embodiments, horizontal probing is used when multiple annotators are available. Horizontal probing is performed to cross-validate annotators by seeking confirmation from other annotators. In some embodiments, the higher the suspicion for a sample and/or annotator, the more additional annotators are sought for confirmation. In some embodiments, given a sample E requiring probing to confirm the label provided by a first annotator, the learner determines the number of probes n needed to confirm the sample E and the minimum acceptable Inter-Annotator Agreement (e.g., (n, $IAA_{min}$)=$F_5$(TS, Risk (E)). In some embodiments, the learner sends the sample E to the required number of annotators n and receives a label for sample E from each annotator. In some embodiments, the learner determines an inter-annotator agreement based on the labels for sample E received from each annotator (e.g., IAA=$F_6$($L_1$, $L_2$, ..., $L_n$)). In some embodiments, the learner adjusts the trust score of the first annotator based on the Inter-Annotator Agreement and the minimum acceptable Inter-Annotator Agreement (e.g., $TS_{new}$=$F_6$(TS, IAA, $IAA_{min}$)).

In some embodiments of the present invention, the trust scores of all involved annotators is used to determine whether an annotator-provided label is suspicious (e.g., IAA=$F_7$($L_1$, $L_2$, ..., $L_n$, $TS_1$, $TS_2$, ..., $TS_n$)). In these and some other embodiments, greater weight may be given to trusted annotators. In some embodiments, the learner keeps track of the annotators of all the samples stored in the ground truth. In these and some other embodiments, the learner determines cumulative ground truth agreement based on the ground truth agreement of each probe and the trust score of the annotator that provided the label for the probe (e.g., CGTA=$F_8$($GTA_1$, $GTA_2$, ..., $GTA_n$, $TS_1$, $TS_2$, ..., $TS_n$)).

In some embodiments of the present invention, the trust score of all involved annotators is adjusted when there is disagreement over a specific probe. In some embodiments, the trust score of all the participating annotators is adjusted based on the level of disagreement and their relative trust scores when performing horizontal probing. In some embodiments, the trust score of all the annotators responsible for the ground truth sample is adjusted based on the level of disagreement when performing vertical probing. In some embodiments, the ground truth sample may be re-labeled if the trust score for the current annotator is high relative to the original annotators. This enables the learner to be self-repairing. In other embodiments, the learner may perform further probing (e.g., horizontal probing) to gather more opinions on the same sample.

In some embodiments of the present invention, when a sample is determined to require probing (e.g., when a sample is determined to be suspicious), the decision as to which type of probing to use is based on one or more policies. In some embodiments, these probing policies include: (1) vertical only policy, where only vertical probing is used regardless of the number of available annotators; (2) horizontal-first policy, where horizontal probing is used unless not enough annotators are available, in which case vertical probing is used; (3) horizontal-first with trust targets policy, similar to the horizontal-first policy but only considers available those annotators that meet a certain minimum trust score; (4) hybrid policy, where the number of required annotators for a horizontal probe is determined, the available annotators are selected, and a vertical probe is issued for each of the selected annotators; and (5) bootstrap policy, where horizontal probing is favored while the ground truth is small, and the policy gradually shifts to a hybrid scheme as the ground truth matures.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method, comprising:
receiving, by one or more processors, a first label for a sample from a first annotator, wherein the sample and the first label form a first labeled sample;
determining, by one or more processors, a plurality of reference model risk scores for the first labeled sample, wherein each reference model risk score corresponds to an amount of risk associated with adding the first labeled sample to a respective reference model of a plurality of reference models;
determining, by one or more processors, an overall risk score for the first labeled sample based on the plurality of reference model risk scores;
in response to determining that the overall risk score is within a predetermined threshold, adding, by one or more processors, the first labeled sample to a set of ground truth samples; and
training, by one or more processors, a machine learning model using the set of ground truth samples.

2. The method of claim 1, wherein each reference model in the plurality of reference models is trained using a different set of labeled samples selected from the set of ground truth samples.

3. The method of claim 1, further comprising:
determining, by one or more processors, a probe for confirmation of the first labeled sample, wherein the probe comprises a labeled sample determined to have a high confidence;
and determining, by one or more processors, a confirmation of the first labeled sample based on one or more second labels for the probe received from one or more annotators.

4. The method of claim 3, wherein determining, by one or more processors, a confirmation of the first labeled sample based on one or more second labels for the probe received from one or more annotators comprises:
sending, by one or more processors, the probe to the first annotator;
receiving, by one or more processors, a second label for the probe from the first annotator;
determining, by one or more processors, a ground truth agreement score for the probe based on the second label; and
determining, by one or more processors, a trust score for the first annotator based on the ground truth agreement score;
wherein adding the first labeled sample to the set of ground truth samples is further in response to determining that the trust score for the first annotator is within a predetermined threshold.

5. The method of claim 3, wherein determining, by one or more processors, a confirmation of the first labeled sample based on one or more second labels for the probe received from one or more annotators comprises:
determining, by one or more processors, a plurality of annotators for confirmation of the first labeled sample;
sending, by one or more processors, the probe to each annotator in the plurality of annotators;
receiving, by one or more processors, a plurality of second labels for the probe, wherein each second label is received from a respective annotator in the plurality of annotators;
determining, by one or more processors, an inter-annotator agreement score based on the plurality of second labels, wherein the inter-annotator agreement score indicates an amount of agreement between the annotators of the plurality of annotators with respect to the second label; and determining, by one or more processors, a trust score for the first annotator based on the inter-annotator agreement score;

wherein adding the first labeled sample to the set of ground truth samples is further in response to determining that the trust score for the first annotator is within a predetermined threshold.

6. The method of claim 5, further comprising adjusting, by one or more processors, a plurality of trust scores corresponding to the plurality of annotators based, at least in part, on the inter-annotator agreement score.

7. A computer program product comprising:

one or more computer readable storage media; and program instructions stored on the one or more computer readable storage media, the program instructions comprising:

program instructions to receive a first label for a sample from a first annotator, wherein the sample and the first label form a first labeled sample;

program instructions to determine a plurality of reference model risk scores for the first labeled sample, wherein each reference model risk score corresponds to an amount of risk associated with adding the first labeled sample to a respective reference model of a plurality of reference models;

program instructions to determine an overall risk score for the first labeled sample based on the plurality of reference model risk scores;

program instructions to, in response to determining that the overall risk score is within a predetermined threshold, add the first labeled sample to a set of ground truth samples; and program instructions to train a machine learning model using the set of ground truth samples.

8. The computer program product of claim 7, wherein each reference model in the plurality of reference models is trained using a different set of labeled samples selected from the set of ground truth samples.

9. The computer program product of claim 7, further comprising program instructions, stored on the one or more computer readable storage media, to:

determine a probe for confirmation of the first labeled sample, wherein the probe comprises a labeled sample determined to have a high confidence; and determine a confirmation of the first labeled sample based on one or more second labels for the probe received from one or more annotators.

10. The computer program product of claim 9, wherein the program instructions to determine a confirmation of the first labeled sample based on one or more second labels for the probe received from one or more annotators comprise:

program instructions to send the probe to the first annotator;

program instructions to receive a second label for the probe from the first annotator;

program instructions to determine a ground truth agreement score for the probe based on the second label; and program instructions to determine a trust score for the first annotator based on the ground truth agreement score;

wherein adding the first labeled sample to the set of ground truth samples is further in response to determining that the trust score for the first annotator is within a predetermined threshold.

11. The computer program product of claim 9, wherein the program instructions to determine a confirmation of the first labeled sample based on one or more second labels for the probe received from one or more annotators comprise:

program instructions to determine a plurality of annotators for confirmation of the first labeled sample;

program instructions to send the probe to each annotator in the plurality of annotators;

program instructions to receive a plurality of second labels for the probe, wherein each second label is received from a respective annotator in the plurality of annotators;

program instructions to determine an inter-annotator agreement score based on the plurality of second labels, wherein the inter-annotator agreement score indicates an amount of agreement between the annotators of the plurality of annotators with respect to the second label; and program instructions to determine a trust score for the first annotator based on the inter-annotator agreement score;

wherein adding the first labeled sample to the set of ground truth samples is further in response to determining that the trust score for the first annotator is within a predetermined threshold.

12. The computer program product of claim 11, further comprising program instructions, stored on the one or more computer readable storage media, to adjust a plurality of trust scores corresponding to the plurality of annotators based, at least in part, on the inter-annotator agreement score.

13. A computer system comprising:

one or more computer processors;

one or more computer readable media; and program instructions, stored on the one or more computer readable media for execution by at least one of the one or more processors, the program instructions comprising:

program instructions to receive a first label for a sample from a first annotator, wherein the sample and the first label form a first labeled sample;

program instructions to determine a plurality of reference model risk scores for the first labeled sample, wherein each reference model risk score corresponds to an amount of risk associated with adding the first labeled sample to a respective reference model of a plurality of reference models;

program instructions to determine an overall risk score for the first labeled sample based on the plurality of reference model risk scores;

program instructions to, in response to determining that the overall risk score is within a predetermined threshold, add the first labeled sample to a set of ground truth samples; and program instructions to train a machine learning model using the set of ground truth samples.

14. The computer system of claim 13, wherein each reference model in the plurality of reference models is trained using a different set of labeled samples selected from the set of ground truth samples.

15. The computer system of claim 13, further comprising program instructions, stored on the one or more computer readable storage media for execution by at least one of the one or more processors, to:

determine a probe for confirmation of the first labeled sample, wherein the probe comprises a labeled sample determined to have a high confidence; and determine a confirmation of the first labeled sample based on one or more second labels for the probe received from one or more annotators.

16. The computer system of claim 15, wherein the program instructions to determine a confirmation of the first labeled sample based on one or more second labels for the probe received from one or more annotators comprise:
   program instructions to send the probe to the first annotator;
   program instructions to receive a second label for the probe from the first annotator;
   program instructions to determine a ground truth agreement score for the probe based on the second label; and
   program instructions to determine a trust score for the first annotator based on the ground truth agreement score;
   wherein adding the first labeled sample to the set of ground truth samples is further in response to determining that the trust score for the first annotator is within a predetermined threshold.

17. The computer system of claim 15, wherein the program instructions to determine a confirmation of the first labeled sample based on one or more second labels for the probe received from one or more annotators comprise:
   program instructions to determine a plurality of annotators for confirmation of the first labeled sample;
   program instructions to send the probe to each annotator in the plurality of annotators;
   program instructions to receive a plurality of second labels for the probe, wherein each second label is received from a respective annotator in the plurality of annotators;
   program instructions to determine an inter-annotator agreement score based on the plurality of second labels, wherein the inter-annotator agreement score indicates an amount of agreement between the annotators of the plurality of annotators with respect to the second label; and
   program instructions to determine a trust score for the first annotator based on the inter- annotator agreement score;
   wherein adding the first labeled sample to the set of ground truth samples is further in response to determining that the trust score for the first annotator is within a predetermined threshold.

18. The computer system of claim 17, further comprising program instructions, stored on the cone or more computer readable media for execution by at least one of the one or more processors, to adjust a plurality of trust scores corresponding to the plurality of annotators based, at least in part, on the inter-annotator agreement score.

19. A method, comprising:
   receiving, by one or more processors, a first label for a sample from a first annotator, wherein the sample and the first label form a first labeled sample;
   determining, by one or more processors, a plurality of reference model risk scores for the first labeled sample, wherein each reference model risk score corresponds to an amount of risk associated with adding the first labeled sample to a respective reference model of a plurality of reference models;
   determining, by one or more processors, an overall risk score for the first labeled sample based on the plurality of reference model risk scores;
   determining, by one or more processors, a probe for confirmation of the first labeled sample, wherein the probe comprises a labeled sample determined to have a high confidence;
   determining, by one or more processors, a trust score for the first annotator based on one or more second labels for the probe received from one or more annotators;
   in response to determining the overall risk score and the trust score are each within respective predetermined thresholds, adding, by one or more processors, the first labeled sample to a set of ground truth samples; and
   training, by one or more processors, a machine learning model using the set of ground truth samples.

20. The method of claim 19, wherein each reference model in the plurality of reference models is trained using a different set of labeled samples selected from the set of ground truth samples.

21. The method of claim 19, wherein determining, by one or more processors, a trust score for the first annotator sample based on one or more second labels for the probe received from one or more annotators comprises:
   sending, by one or more processors, the probe to the first annotator;
   receiving, by one or more processors, a second label for the probe from the first annotator;
   determining, by one or more processors, a ground truth agreement score for the probe based on the second label; and
   determining, by one or more processors, a trust score for the first annotator based on the ground truth agreement score.

22. The method of claim 19, wherein determining, by one or more processors, a confirmation of the first labeled sample based on one or more second labels for the probe received from one or more annotators comprises:
   determining, by one or more processors, a plurality of annotators for confirmation of the first labeled sample;
   sending, by one or more processors, the probe to each annotator in the plurality of annotators;
   receiving, by one or more processors, a plurality of second labels for the probe, wherein each second label is received from a respective annotator in the plurality of annotators;
   determining, by one or more processors, an inter-annotator agreement score based on the plurality of second labels, wherein the inter-annotator agreement score indicates an amount of agreement between the annotators of the plurality of annotators with respect to the second label; and
   determining, by one or more processors, a trust score for the first annotator based on the inter-annotator agreement score.

23. A method, comprising:
   determining, by one or more processors, a probe for determining a trust score for a first annotator, wherein the probe comprises a labeled sample determined to have a high confidence;
   determining, by one or more processors, a trust score for the first annotator based on one or more second labels for the probe received from one or more annotators; and
   in response to determining that the trust score is within a predetermined threshold, training, by one or more processors, a machine learning model using one or more ground truth samples having labels generated by the first annotator.

24. The method of claim 23, wherein determining, by one or more processors, a confirmation of the first labeled sample based on one or more second labels for the probe received from one or more annotators comprises:

sending, by one or more processors, the probe to the first annotator;

receiving, by one or more processors, a second label for the probe from the first annotator;

determining, by one or more processors, a ground truth agreement score for the probe based on the second label; and determining, by one or more processors, a trust score for the first annotator based on the ground truth agreement score.

25. The method of claim 23, wherein determining, by one or more processors, a confirmation of the first labeled sample based on one or more second labels for the probe received from one or more annotators comprises:

determining, by one or more processors, a plurality of annotators for confirmation of the first labeled sample;

sending, by one or more processors, the probe to each annotator in the plurality of annotators;

receiving, by one or more processors, a plurality of second labels for the probe, wherein each second label is received from a respective annotator in the plurality of annotators;

determining, by one or more processors, an inter-annotator agreement score based on the plurality of second labels, wherein the inter-annotator agreement score indicates an amount of agreement between the annotators of the plurality of annotators with respect to the second label; and determining, by one or more processors, a trust score for the first annotator based on the inter-annotator agreement score.

* * * * *